US008579052B2

(12) United States Patent
DiGiovanni et al.

(10) Patent No.: US 8,579,052 B2
(45) Date of Patent: Nov. 12, 2013

(54) POLYCRYSTALLINE COMPACTS INCLUDING IN-SITU NUCLEATED GRAINS, EARTH-BORING TOOLS INCLUDING SUCH COMPACTS, AND METHODS OF FORMING SUCH COMPACTS AND TOOLS

(75) Inventors: Anthony A. DiGiovanni, Houston, TX (US); Danny E. Scott, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 446 days.

(21) Appl. No.: 12/852,313

(22) Filed: Aug. 6, 2010

(65) Prior Publication Data
US 2011/0031034 A1 Feb. 10, 2011

Related U.S. Application Data

(60) Provisional application No. 61/232,265, filed on Aug. 7, 2009.

(51) Int. Cl.
*E21B 10/00* (2006.01)
*E21B 10/46* (2006.01)
*E21B 10/48* (2006.01)

(52) U.S. Cl.
CPC ...................................... *E21B 10/48* (2013.01)
USPC .................... 175/405.1; 175/420.2; 175/425; 175/433; 175/434

(58) Field of Classification Search
USPC .................... 175/405.1, 420.2, 425, 433, 434
See application file for complete search history.

(56) References Cited

U.S. PATENT DOCUMENTS

| 3,745,623 A | 7/1973 | Wentorf, Jr. et al. |
| 4,224,380 A | 9/1980 | Bovenkerk et al. |
| 4,610,699 A | 9/1986 | Yazu |
| RE32,380 E | 3/1987 | Wentorf, Jr. et al. |

(Continued)

FOREIGN PATENT DOCUMENTS

| WO | 2004078641 A1 | 9/2004 |
| WO | 2006032982 A1 | 3/2006 |

(Continued)

OTHER PUBLICATIONS

International Preliminary Report on Patentability and Written Opinion for International Application No. PCT/US2010/044767 dated Feb. 7, 2012, 5 pages.

(Continued)

*Primary Examiner* — Cathleen Hutchins
(74) *Attorney, Agent, or Firm* — TraskBritt

(57) ABSTRACT

Polycrystalline compacts include hard polycrystalline materials comprising in situ nucleated smaller grains of hard material interspersed and inter-bonded with larger grains of hard material. The average size of the larger grains may be at least about 250 times greater than the average size of the in situ nucleated smaller grains. Methods of forming polycrystalline compacts include nucleating and catalyzing the formation of smaller grains of hard material in the presence of larger grains of hard material, and catalyzing the formation of inter-granular bonds between the grains of hard material. For example, nucleation particles may be mixed with larger diamond grains, a carbon source, and a catalyst. The mixture may be subjected to high temperature and high pressure to form smaller diamond grains using the nucleation particles, the carbon source, and the catalyst, and to catalyze formation of diamond-to-diamond bonds between the smaller and larger diamond grains.

27 Claims, 4 Drawing Sheets

(56) References Cited

U.S. PATENT DOCUMENTS

| | | |
|---|---|---|
| 5,011,514 A | 4/1991 | Cho et al. |
| 5,096,465 A * | 3/1992 | Chen et al. ............. 51/295 |
| 5,127,923 A | 7/1992 | Bunting et al. |
| 5,151,107 A | 9/1992 | Cho et al. |
| 5,205,684 A | 4/1993 | Meskin et al. |
| 5,370,195 A | 12/1994 | Keshavan et al. |
| 5,536,485 A | 7/1996 | Kume et al. |
| 5,954,147 A | 9/1999 | Overstreet et al. |
| 6,009,963 A | 1/2000 | Chaves et al. |
| 6,063,149 A * | 5/2000 | Zimmer ............. 51/295 |
| 6,090,343 A | 7/2000 | Kear et al. |
| 6,194,481 B1 | 2/2001 | Furman et al. |
| 6,248,447 B1 | 6/2001 | Griffin et al. |
| 6,548,264 B1 | 4/2003 | Tan et al. |
| 6,852,414 B1 | 2/2005 | Frushour |
| 7,037,583 B2 | 5/2006 | Furman et al. |
| 7,060,641 B2 | 6/2006 | Qian et al. |
| 7,070,635 B2 | 7/2006 | Frushour |
| 7,309,526 B2 | 12/2007 | Smith et al. |
| 7,396,505 B2 | 7/2008 | Pope et al. |
| 7,397,558 B2 | 7/2008 | Kamins |
| 7,493,973 B2 | 2/2009 | Keshavan et al. |
| 7,510,034 B2 | 3/2009 | Curry et al. |
| 7,516,804 B2 | 4/2009 | Vail |
| 7,527,860 B2 | 5/2009 | Chih et al. |
| 7,556,743 B2 | 7/2009 | Furman et al. |
| 7,635,035 B1 | 12/2009 | Bertagnolli et al. |
| 7,971,663 B1 | 7/2011 | Vail |
| 2004/0238227 A1 | 12/2004 | Smith et al. |
| 2005/0019114 A1 | 1/2005 | Sung |
| 2005/0051366 A1 | 3/2005 | Frushour |
| 2005/0133277 A1* | 6/2005 | Dixon ............. 175/426 |
| 2005/0186104 A1 | 8/2005 | Kear et al. |
| 2006/0162969 A1 | 7/2006 | Belnap et al. |
| 2006/0191722 A1 | 8/2006 | Belnap et al. |
| 2007/0056778 A1 | 3/2007 | Webb et al. |
| 2007/0079994 A1 | 4/2007 | Middlemiss |
| 2007/0144790 A1 | 6/2007 | Fang et al. |
| 2007/0151769 A1 | 7/2007 | Slutz et al. |
| 2007/0187153 A1 | 8/2007 | Bertagnolli |
| 2007/0234646 A1 | 10/2007 | Cat et al. |
| 2008/0023230 A1 | 1/2008 | Cho |
| 2008/0023231 A1 | 1/2008 | Vail |
| 2008/0073126 A1 | 3/2008 | Shen et al. |
| 2008/0073127 A1 | 3/2008 | Zhan et al. |
| 2008/0115424 A1 | 5/2008 | Can et al. |
| 2008/0127475 A1 | 6/2008 | Griffo |
| 2008/0168717 A1 | 7/2008 | Can et al. |
| 2008/0179104 A1 | 7/2008 | Zhang et al. |
| 2008/0206576 A1 | 8/2008 | Qian et al. |
| 2008/0209818 A1 | 9/2008 | Belnap et al. |
| 2008/0210473 A1 | 9/2008 | Zhang et al. |
| 2008/0282618 A1 | 11/2008 | Lockwood |
| 2009/0071726 A1 | 3/2009 | Belnap et al. |
| 2009/0095538 A1 | 4/2009 | Middlemiss |
| 2009/0107291 A1 | 4/2009 | Levashov et al. |
| 2009/0152015 A1 | 6/2009 | Sani et al. |
| 2010/0243335 A1 | 9/2010 | Dourfaye et al. |
| 2010/0294571 A1 | 11/2010 | Belnap et al. |
| 2011/0023375 A1 | 2/2011 | Sani et al. |
| 2011/0023377 A1 | 2/2011 | DiGiovanni |
| 2011/0031037 A1 | 2/2011 | Bellin et al. |
| 2011/0036643 A1 | 2/2011 | Belnap et al. |
| 2011/0061942 A1 | 3/2011 | DiGiovanni |
| 2011/0088954 A1 | 4/2011 | DiGiovanni et al. |
| 2011/0214921 A1 | 9/2011 | Naidoo |
| 2011/0252712 A1 | 10/2011 | Chakraborty et al. |
| 2012/0037431 A1 | 2/2012 | DiGiovanni et al. |
| 2012/0111642 A1 | 5/2012 | DiGiovanni |

FOREIGN PATENT DOCUMENTS

| | | |
|---|---|---|
| WO | 2006032984 A2 | 3/2006 |
| WO | 2006032984 A3 | 3/2006 |
| WO | 2007035394 A2 | 3/2007 |
| WO | 2007088461 A1 | 8/2007 |
| WO | 2007110770 A1 | 10/2007 |
| WO | 2007144731 A2 | 12/2007 |
| WO | 2007144731 A3 | 12/2007 |
| WO | 2007144733 A2 | 12/2007 |
| WO | 2007148214 A3 | 12/2007 |
| WO | 2007149266 A1 | 12/2007 |
| WO | 2008053431 A1 | 5/2008 |
| WO | 2008094190 A2 | 8/2008 |
| WO | 2008096314 A2 | 8/2008 |
| WO | 2008114228 A1 | 9/2008 |
| WO | 2009132035 A1 | 10/2009 |

OTHER PUBLICATIONS

International Search Report for International Application No. PCT/US2010/044767 mailed Mar. 30, 2011, 3 pages.

International Written Opinion for International Application No. PCT/US2010/044767 mailed Mar. 30, 2011, 3 pages.

International Search Report for International Application No. PCT/US2010/048343 mailed Apr. 28, 2011, 3 pages.

International Written Opinion for International Application No. PCT/US2010/048343 mailed Apr. 28, 2011, 3 pages.

Arima et al., Diamond nucleat on and growth by reduct on of carbonate melts under high-pressure and high-temperature conditions, Geology; Aug. 2002; 30(8):691-694.

Athanassiou et al., Large-scale production of carbon-coated copper nanoparticles for sensor applications, Nanotechnology, 2006, vol. 17, pp. 1668-1673.

Banhart et al., Carbon onions as nanoscopic pressure cells for diamond formation, Letters to Nature, Aug. 1, 1996, vol. 382, pp. 433-435.

Berger, A green synthesis technique for fabricating carbon-coated magnetic nanoparticles, 2 pages, posted Aug. 15, 2006, copyright 2006 Nanowerk LLC.

Beulens et al., Diamond, Graphite, ad Amorphous Carbon Deposition, Le Vide, Les Couches Minces, Supplement No. 256, Mar.-Apr. 1991, pp. 329-331.

Dahl et al., Isolation and Structure of Higher Diamondoids, Nanometer-Sized Diamond Molecules, Science, Jan. 3, 2003; 299(96):96-99.

DiGiovanni, Polycrystalline Compacts Having Material Disposed in Interstitial Spaces Therein, Cutting Elements and Earth-Boring Tools Including Such Compacts, and Methods of Forming Such Compacts, U.S. Appl. No. 12/558,184, filed Sep. 11, 2009.

Fangli, Yuan, et al., "Preparation of zinc oxide nano-particles coated with aluminum," Journal of Materials Science Letters, vol. 20, pp. 1549-1551, 2001.

Ghiringhelli et al., Local Structure of Liquid Carbon Controls Diamond Nucleation, Physical Review Letters, Aug. 3, 2007; 99:0557021-055702-4.

Giber et al., Critical Point Energies in hcp and fcc Cobalt from Appearance Potential Spectra, Appl. Phys. 1991; 52:167-170.

Itoh et al., "Amorphous carbon nitride film preparation by plasma-assisted pulsed laser deposition method," Appl. Phys. A, vol. 79, pp. 1575-1578, 2004.

Kidalov et al., Thermal Conductivity of Nanocomposites Based on Diamonds and Nanodiamonds, Science Direct, Diamond & Related Materials, 2007; 16:2063-2066.

Li et al., Field emission enhancement of amorphous carbon films by nitrogen-implantation, Carbon, vol. 42, pp. 2309-2314, 2004.

Li et al. Photocatalytic characterization of silica coated titania nanoparticles with tunable coatings, Journal of Nanoparticle Research, vol. 7, pp. 295-299, 2005.

Liu et al., Diamond Chemical Vapor Deposition Nucleation and Early Growth Stages, Department of Chemical and Bioresource Engineering, Colorado State University (1995) 198 pages.

Liu et al., Nucleation Kinetics of Diamond on Carbide-Forming Substrates During Chemical Vapor Deposition, J. Electrochem. Soc., Mar. 1996; 143(3):1104-1109.

Liu et al., Studies on Nucleation Process in Diamond CVD; and Overview of Recent Developments, Diamond & Related Materials, 1995; 4:1173-1188.

(56) References Cited

OTHER PUBLICATIONS

Majetich et al., Preparation and Properties of Carbon-Coated Magnetic Nanocrystallites, Phys. Rev. 1993; 48:16845-16848.

Meilunas et al., Diamond Nucleation on Surfaces Using Carbon Clusters, 93-5-17-018, Technical Report 12, Grant #N0001489J1848, Published JMR, 1993.

Osipov et al., Rapid Sintering of Nano-Diamond Compacts, Diamond Relat. Mater. (2009) doi: 10.1016/j. diamond.2009.01.041.

Qian et al., Graphitization of Diamond Powders of Different Sizes at High Pressure-High Temperature, Carbon 2004; 42:2691-2697.

Qian et al., Micron Diamond Composites with Nanocrystalline Silicon Carbide Bonding, J. Mater. Res. May 2003; 18(5):1173-1178.

Sadangi et al., WC-Co-Diamond Nano-Composites, NanoStructured Materials 1999; 12:1031-1034.

Schmidt et al., Watching the Growth of Bulk Grains During Recrystallization of Deformed Metals, Science 2004; 305:229-232.

Sumiya et al., Synthesis of High-Purity Nano-Polycrystalline Diamond and its Characterization, Sci Technical Review, Jan. 2005, No. 59, pp. 53-59.

Wang et al., Effect of Recrystallized Graphite on the Nucleation of Diamond in Film Growth Reactions, Science and Technology of New Diamond, 1990, pp. 257-259.

Wei, Xian-Wen, et al., "A solution phase fabrication of magnetic nanoparticles encapsulated in carbon," Nanotechnology, vol. 17, pp. 4307-4311, 2006.

Welz et al., Nucleation, Growth, and Graphitization of Diamond Nanocrystals During Chlorination of Carbides, Journal of Applied Physics, Apr. 1, 2003; 93(7):4207-4214.

Wheeler, Microstructural Characterization of Cobalt-Tungsten Coated Graphite Fibers, Journal of Research of the National Institute of Standards and Technology, Nov.-Dec. 1995; 100(6):641-659.

Wu et al., Nanostructured Ni—Co Alloys with Tailorable Grain Size and Twin Density, Metallurgical and Materials Transactions A, Jul. 2005, vol. 36A, pp. 1927-1936.

Yanchuk et al., Raman Scattering, AFM and Nanoindentation Characterization of Diamond Films Obtained by Hot Filament CVD, Diamond and Related Materials (2004) vol. 13, pp. 266-269.

Yushin et al., Effect of Sintering on Structure of Nanodiamond, Diamond & Related Materials (2005) vol. 14, pp. 1721-1729.

Zhang et al., Ultrafine and nanoscaled tungsten carbide synthesis from colloidal carbon coated nano tungsten precursor, Powder Metallurgy, vol. 49, No. 4, pp. 369-373, 2006.

Zhao et al., Superhard B-C-N Materials Synthesized in Nanostructured Bulks, J. Mater. Res., Dec. 2002; 17(12):3139-3145.

DiGiovanni, U.S. Appl. No. 13/226,127 entitled Polycrystalline Compacts Including Nanoparticulate Inclusions, Cutting Elements and Earth-Boring Tools Including Such Compacts, and Methods of Forming Same filed Sep. 6, 2011.

U.S. Appl. No. 61/324,142, filed Apr. 14, 2010 and entitled Method of Preparing Polycrystalline Diamond from Derivatized Nanodiamond.

Furman et al., Structural and Mechanical Behavior of Layered Zirconium Phosphonate as a Distributed Phase in Polycaprolactone, Journal of Applied Polymer Science, vol. 114, pp. 993-1001, 2009.

\* cited by examiner

POLYCRYSTALLINE COMPACTS INCLUDING IN-SITU NUCLEATED GRAINS, EARTH-BORING TOOLS INCLUDING SUCH COMPACTS, AND METHODS OF FORMING SUCH COMPACTS AND TOOLS

CROSS-REFERENCE TO RELATED APPLICATION

This application claims the benefit of U.S. Provisional Patent Application Ser. No. 61/232,265 filed Aug. 7, 2009, the disclosure of which is hereby incorporated herein by this reference in its entirety.

TECHNICAL FIELD

The present invention relates generally to polycrystalline compacts, to tools including such compacts, and to methods of forming such polycrystalline compacts and tools.

BACKGROUND

Earth-boring tools for forming wellbores in subterranean earth formations generally include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit.

The cutting elements used in such earth-boring tools often include polycrystalline diamond compact (often referred to as "PDC") cutting elements, which are cutting elements that include cutting faces of a polycrystalline diamond material. Polycrystalline diamond material is material that includes inter-bonded grains or crystals of diamond material. In other words, polycrystalline diamond material includes direct, inter-granular bonds between the grains or crystals of diamond material. The terms "grain" and "crystal" are used synonymously and interchangeably herein.

Polycrystalline diamond compact cutting elements are formed by sintering and bonding together relatively small diamond grains under conditions of high temperature and high pressure in the presence of a catalyst (such as, for example, cobalt, iron, nickel, or alloys and mixtures thereof) to form a layer or "table" of polycrystalline diamond material on a cutting element substrate. These processes are often referred to as high temperature/high pressure (or "HTHP") processes. The cutting element substrate may comprise a cermet material (i.e., a ceramic-metal composite material) such as, for example, cobalt-cemented tungsten carbide. In such instances, the cobalt (or other catalyst material) in the cutting element substrate may be swept into the diamond grains during sintering and serve as the catalyst material for forming the inter-granular diamond-to-diamond bonds between, and the resulting diamond table from, the diamond grains. In other methods, powdered catalyst material may be mixed with the diamond grains prior to sintering the grains together in a HTHP process.

Upon formation of a diamond table using a HTHP process, catalyst material may remain in interstitial spaces between the grains of diamond in the resulting polycrystalline diamond table. The presence of the catalyst material in the diamond table may contribute to thermal damage in the diamond table when the cutting element is heated during use, due to friction at the contact point between the cutting element and the formation.

Polycrystalline diamond compact cutting elements in which the catalyst material remains in the diamond table are generally thermally stable up to a temperature of about seven hundred fifty degrees Celsius (750° C.), although internal stress within the cutting element may begin to develop at temperatures exceeding about four hundred degrees Celsius (400° C.) due to a phase change that occurs in cobalt at that temperature (a change from the "beta" phase to the "alpha" phase). Also beginning at about four hundred degrees Celsius (400° C.), there is an internal stress component that arises due to differences in the thermal expansion of the diamond grains and the catalyst metal at the grain boundaries. This difference in thermal expansion may result in relatively large tensile stresses at the interface between the diamond grains, and contributes to thermal degradation of the microstructure when polycrystalline diamond compact cutting elements are used in service. Differences in the thermal expansion between the diamond table and the cutting element substrate to which it is bonded further exacerbate the stresses in the polycrystalline diamond compact. This differential in thermal expansion may result in relatively large compressive and/or tensile stresses at the interface between the diamond table and the substrate that eventually lead to the deterioration of the diamond table, cause the diamond table to delaminate from the substrate, or result in the general ineffectiveness of the cutting element.

Furthermore, at temperatures at or above about seven hundred fifty degrees Celsius (750° C.), some of the diamond crystals within the diamond table may react with the catalyst material causing the diamond crystals to undergo a chemical breakdown or conversion to another allotrope of carbon. For example, the diamond crystals may graphitize at the diamond crystal boundaries, which may substantially weaken the diamond table. Also, at extremely high temperatures, in addition to graphite, some of the diamond crystals may be converted to carbon monoxide and carbon dioxide.

In order to reduce the problems associated with differences in thermal expansion and chemical breakdown of the diamond crystals in polycrystalline diamond cutting elements, so-called "thermally stable" polycrystalline diamond compacts (which are also known as thermally stable products, or "TSPs") have been developed. Such a thermally stable polycrystalline diamond compact may be formed by leaching the catalyst material (e.g., cobalt) out from interstitial spaces between the inter-bonded diamond crystals in the diamond table using, for example, an acid or combination of acids (e.g., aqua regia). A substantial amount of the catalyst material may be removed from the diamond table, or catalyst material may be removed from only a portion thereof. Thermally stable polycrystalline diamond compacts in which substantially all catalyst material has been leached out from the diamond table have been reported to be thermally stable up to temperatures of about twelve hundred degrees Celsius (1,200° C.). It has also been reported, however, that such fully leached diamond tables are relatively more brittle and vulnerable to shear, compressive, and tensile stresses than are non-leached diamond tables. In addition, it is difficult to secure a completely leached diamond table to a supporting substrate. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which the catalyst material has been leached from a portion or portions of the diamond table. For example, it is known to leach catalyst material from the cutting face, from the side of the diamond table, or both, to a desired depth within the diamond table, but without leaching all of the catalyst material out from the diamond table.

BRIEF SUMMARY

In some embodiments, the present invention includes polycrystalline compacts that include a hard polycrystalline material comprising a plurality of in situ nucleated smaller grains of hard material and a plurality of larger grains of hard material. The in situ nucleated smaller grains of hard material and the larger grains of hard material are interspersed and inter-bonded to form the hard polycrystalline material.

In additional embodiments, the present invention includes methods of forming polycrystalline compacts in which smaller grains of hard material are nucleated in the presence of larger grains of hard material. The formation of the smaller grains may be catalyzed. Furthermore, the formation of inter-granular bonds between the smaller grains of hard material and the larger grains of hard material is also catalyzed.

Further embodiments of the present invention include methods of forming polycrystalline diamond compacts. A plurality of nucleation particles are mixed with a plurality of larger diamond grains, a carbon source, and a catalyst for catalyzing the formation of diamond material. The resulting mixture is subjected to a pressure greater than about five gigapascals (5.0 GPa) and a temperature greater than about one-thousand degrees Celsius (1,000° C.). Under such conditions, a plurality of smaller diamond grains are formed on the nucleation particles using the carbon source and the catalyst. The formation of diamond-to-diamond bonds between the diamond grains of the larger diamond grains and the smaller diamond grains is catalyzed, and the formation of the diamond-to-diamond bonds between the diamond grains results in the formation of a polycrystalline diamond material.

BRIEF DESCRIPTION OF THE SEVERAL VIEWS OF THE DRAWINGS

While the specification concludes with claims particularly pointing out and distinctly claiming what are regarded as embodiments of the present invention, various features and advantages of embodiments of the invention may be more readily ascertained from the following description of some embodiments of the invention when read in conjunction with the accompanying drawings, in which:

DETAILED DESCRIPTION OF THE INVENTION

The illustrations presented herein are not actual views of any particular polycrystalline compact, microstructure of polycrystalline material, particles, or drill bit, and are not drawn to scale, but are merely idealized representations that are employed to describe embodiments of the invention. Additionally, elements common between figures may retain the same numerical designation.

As used herein, the term "drill bit" means and includes any type of bit or tool used for drilling during the formation or enlargement of a wellbore and includes, for example, rotary drill bits, percussion bits, core bits, eccentric bits, bicenter bits, reamers, expandable reamers, mills, drag bits, roller cone bits, hybrid bits and other drilling bits and tools known in the art.

As used herein, the term "fullerene" means and includes cage-like hollow molecules comprising a plurality of carbon atoms bonded together in a polyhedral structure. Fullerenes may include, for example, between about twenty (20) and about one hundred (100) carbon atoms. For example, $C_{60}$ is a fullerene having sixty (60) carbon atoms, and is a relatively common, commercially available fullerene. Other fullerenes include, for example, $C_{30}$, $C_{32}$, $C_{34}$, $C_{38}$, $C_{40}$, $C_{42}$, $C_{44}$, $C_{46}$, $C_{48}$, $C_{50}$, and $C_{52}$ and $C_{70}$.

As used herein, the term "nanoparticle" means and includes any particle having an average particle diameter of about 500 nm or less.

The term "polycrystalline material" means and includes any material comprising a plurality of grains (i.e., crystals) of the material that are bonded directly together by inter-granular bonds. The crystal structures of the individual grains of the material may be randomly oriented in space within the polycrystalline material.

As used herein, the term "inter-granular bond" means and includes any direct atomic bond (e.g., ionic, covalent, metallic, etc.) between atoms in adjacent grains of material.

As used herein, the phrase "in situ nucleated grains" means and includes grains that are nucleated and grown in place within a polycrystalline material as the polycrystalline material is formed.

As used herein, the term "diamondoid" means and includes the carbon cage molecule known as adamantane ($C_{10}H_{16}$), which is the smallest unit cage structure of the diamond crystal lattice, as well as variants of adamantane (e.g., molecules in which other atoms (e.g., N, O, Si, or S) are substituted for carbon atoms in the molecule) and carbon cage polymantane molecules including between two (2) and about twenty (20) adamantane cages per molecule (e.g., diamantane, triamantane, tetramantane, pentamantane, hexamantane, heptamantane, etc.).

Figure 1A:
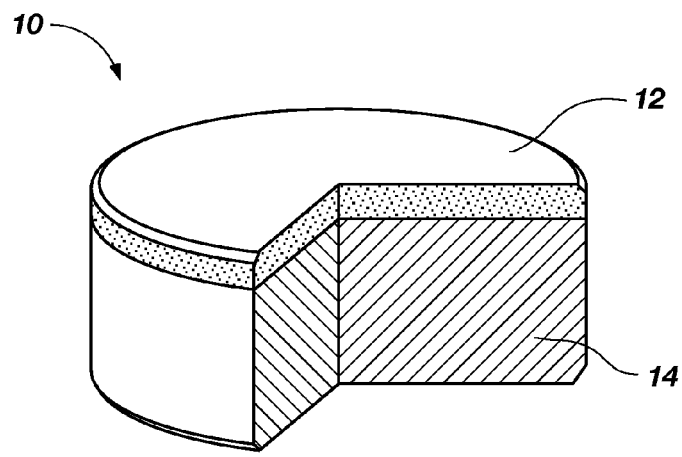
FIG. 1A illustrates an embodiment of a polycrystalline compact of the present invention.

FIG. 1A is a simplified drawing illustrating an embodiment of a polycrystalline compact 10 of the present invention. The polycrystalline compact 10 includes a table or layer of hard polycrystalline material 12 that has been provided on (e.g., formed on or secured to) a surface of a supporting substrate 14. In additional embodiments, the polycrystalline compact 10 may simply comprise a volume of the hard polycrystalline material 12 having any desirable shape, and may not include any supporting substrate 14.

In some embodiments, the hard polycrystalline material 12 comprises polycrystalline diamond. In other embodiments, the hard polycrystalline material 12 may comprise another hard material such as, for example, cubic boron nitride, silicon nitride, silicon carbide, titanium carbide, tungsten carbide, tantalum carbide, or another hard material.

Figure 1B:
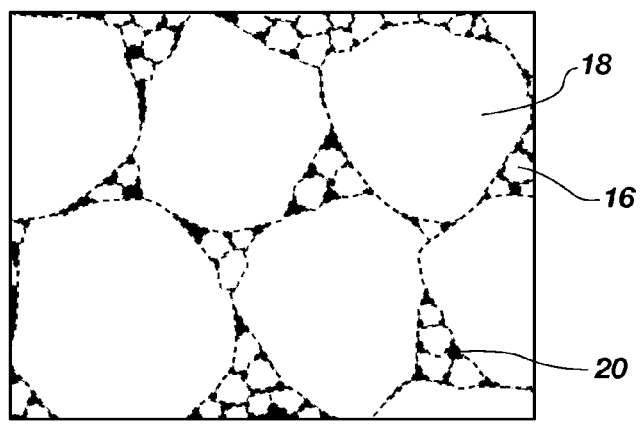
FIG. 1B is a simplified drawing showing how the polycrystalline material of FIG. 1A may appear under magnification, and illustrates inter-bonded larger and smaller grains of hard material.

FIG. 1B is an enlarged view illustrating how a microstructure of the hard polycrystalline material 12 of the compact 10 (FIG. 1A) may appear under magnification. As shown in FIG. 1B, the grains of the hard polycrystalline material 12 have a multi-modal (e.g., bi-modal, tri-modal, etc.) grain size distribution. In other words, the hard polycrystalline material 12 includes a first plurality of grains 16 of hard material having a first average grain size, and at least a second plurality of grains 18 of hard material having a second average grain size that differs from the first average grain size of the first plurality of grains 16.

The second plurality of grains 18 may be larger than the first plurality of grains 16. While FIG. 1B illustrates the plurality of grains 18 as being larger, on average, than the first plurality of grains 16, the drawing is not drawn to scale and has been simplified for purposes of illustration. In some embodiments, the difference between the average sizes of the first plurality of grains 16 and the second plurality of grains 18 may be greater than or less than the difference in the average grain sizes illustrated in FIG. 1B. For example, the average grain size of the larger grains 18 may be at least about one hundred fifty (150) times greater than the average grain size of the smaller grains 16. In some embodiments, the average grain size of the larger grains 18 may be between about two hundred fifty (250) times and about seven hundred fifty times (750) greater than the average grain size of the smaller grains 16. The smaller grains 16 and the larger grains 18 may be interspersed and inter-bonded to form the hard polycrystalline material 12. In other words, in embodiments in which the hard polycrystalline material 12 comprises polycrystalline diamond, the smaller grains 16 and the larger grains 18 may be dispersed amongst and bonded directly to one another by inter-granular diamond-to-diamond bonds.

As known in the art, the average grain size of grains within a microstructure may be determined by measuring grains of the microstructure under magnification. For example, a scanning electron microscope (SEM), a field emission scanning electron microscope (FESEM), or a transmission electron microscope (TEM) may be used to view or image a surface of a hard polycrystalline material 12 (e.g., a polished and etched surface of the hard polycrystalline material 12). Commercially available vision systems or image analysis software are often used with such microscopy tools, and these vision systems are capable of measuring the average grain size of grains within a microstructure.

At least some of the smaller grains 16 of the hard polycrystalline material 12 comprise in situ nucleated grains, as discussed in further detail below.

In embodiments of the present invention, the larger grains 18 may be many more times larger than the smaller grains 16. For example, in some embodiments, and as noted above, the average grain size of the larger grains 18 may be at least about one hundred fifty (150) times greater than the average grain size of the smaller grains 16. In additional embodiments, the average grain size of the larger grains 18 may be at least about two hundred fifty (250) times greater than the average grain size of the smaller grains 16. In additional embodiments, the average grain size of the larger grains 18 may be at least about five hundred (500) times greater than the average grain size of the smaller grains 16. In yet further embodiments, the average grain size of the larger grains 18 may be at least about seven hundred fifty (750) times greater than the average grain size of the smaller grains 16.

By way of example and not limitation, the average grain size of the smaller grains 16 may be between about six nanometers (6 nm) and about one hundred fifty nanometers (150 nm), and the average grain size of the larger grains 18 may be between about five microns (5 µm) and about forty microns (40 µm). Thus, the smaller grains 16 may comprise nanoparticles in the microstructure of the hard polycrystalline material 12.

The large difference in the average grain size between the smaller grains 16 and the larger grains 18 may result in smaller interstitial spaces or voids within the microstructure of the hard polycrystalline material 12 (relative to conventional polycrystalline materials), and the total volume of the interstitial spaces or voids may be more evenly distributed throughout the microstructure of the hard polycrystalline material 12. As a result, any material that might be present within the interstitial spaces (such as, for example, a catalyst material as described below) may also be more evenly distributed throughout the microstructure of the hard polycrystalline material 12 within the relatively smaller interstitial spaces therein.

In some embodiments, the number of smaller grains 16 per unit volume of the hard polycrystalline material 12 may be higher than the number of larger grains 18 per unit volume of the hard polycrystalline material 12.

The smaller grains 16 may comprise between about one-half of one percent (0.5%) and about thirty percent (30%) by volume of the hard polycrystalline material 12. More specifically, the smaller grains 16 may comprise between about one-half of one percent (0.5%) and about ten percent (10%) by volume of the hard polycrystalline material 12, or even between about one-half of one percent (0.5%) and about five percent (5%) by volume of the hard polycrystalline material 12. The remainder of the volume of the hard polycrystalline material 12, may be substantially comprised by the larger grains 18. A relatively small percentage of the remainder of the volume of the hard polycrystalline material 12 (e.g., less than about ten percent (10%)) may comprise interstitial spaces between the smaller and larger grains 16, 18, respectively, which spaces may be at least partially filled with a catalyst or other material, as described below.

In some embodiments, the hard polycrystalline material 12 may include a catalyst material 20 (shaded black in FIG. 1B) disposed in interstitial spaces between the smaller grains 16 and the larger grains 18. The catalyst material 20 may comprise a catalyst material capable of forming (and used to catalyze the formation of) inter-granular bonds between the smaller grains 16 and the larger grains 18 of the hard polycrystalline material 12. In other embodiments, however, the interstitial spaces between the smaller grains 16 and the larger grains 18 in some regions of the hard polycrystalline material 12, or throughout the entire volume of the hard polycrystalline material 12, may be at least substantially free of such a catalyst material 20. In such embodiments, the interstitial spaces may comprise voids filled with gas (e.g., air), or the interstitial spaces may be filled with another material that is not a catalyst material 20 and that will not contribute to degradation of the polycrystalline material 12 when the compact 10 is used in a drilling operation.

In embodiments in which the polycrystalline material 12 comprises polycrystalline diamond, the catalyst material 20 may comprise a Group VIIIA element (e.g., iron, cobalt, or nickel) or an alloy thereof, and the catalyst material 20 may comprise between about 0.1% and about 20% by volume of the hard polycrystalline material 12. In additional embodiments, the catalyst material 20 may comprise a carbonate material such as, for example, a carbonate of one or more of Mg, Ca, Sr, and Ba. Carbonates may also be used to catalyze the formation of polycrystalline diamond.

The hard polycrystalline material 12 of the polycrystalline compact 10 may be formed using a high temperature/high pressure (or "HTHP") process. Such processes, and systems for carrying out such processes, are generally known in the art. In accordance with embodiments of the present invention, however, the smaller grains 16 may be nucleated in situ during the HTHP process used to form the hard polycrystalline material 12.

In some embodiments, the hard polycrystalline material 12 may be formed on a supporting substrate 14 (as shown in FIG. 1A) of cemented tungsten carbide or another suitable substrate material in a conventional HTHP process of the type described, by way of non-limiting example, in U.S. Pat. No. 3,745,623 to Wentorf et al. (issued Jul. 17, 1973), or may be formed as a freestanding polycrystalline compact (i.e., without the supporting substrate 14) in a similar conventional HTHP process as described, by way of non-limiting example, in U.S. Pat. No. 5,127,923 to Bunting et al. (issued Jul. 7, 1992), the disclosure of each of which patents is incorporated herein in its entirety by this reference. In some embodiments, the catalyst material 20 may be supplied from the supporting substrate 14 during an HTHP process used to form the hard polycrystalline material 12. For example, the substrate 14 may comprise a cobalt-cemented tungsten carbide material. The cobalt of the cobalt-cemented tungsten carbide may serve as the catalyst material 20 during the HTHP process.

To form the hard polycrystalline material 12 in an HTHP process, a particulate mixture comprising grains of hard material, as well as nucleation particles (as described in detail below) may be subjected to elevated temperatures (e.g., temperatures greater than about 1,000° C.) and elevated pressures (e.g., pressures greater than about 5.0 gigapascals (GPa)) to form inter-granular bonds between the grains, thereby forming the hard polycrystalline material 12. In some embodiments, the particulate mixture may be subjected to a pressure greater than about six gigapascals (6.0 GPa) and a temperature greater than about 1,500° C. in the HTHP process.

The time at the elevated temperatures and pressures may be relatively short when compared to conventional HTHP processes to prevent the atoms of the in situ nucleated smaller grains 16 from diffusing to, and being incorporated into, the larger grains 18. For example, in some embodiments, the particulate mixture may be subjected to a pressure greater than about six and one half gigapascals (6.5 GPa) and a temperature greater than about 1,500° C. for less than about two minutes (2.0 min.) during the HTHP process.

If necessary or desirable, the temperature may be reduced to about 1,000° C. and held for up to about one hour or more to assist in the nucleation of the smaller grains 16 in situ. Additionally, the temperature may be reduced and maintained at a temperature between about 400° C. and about 800° C. for at least about thirty (30) minutes (e.g., up to about twenty-four (24) hours or more) in a process similar to those known in the art of metallurgy as "re-crystallization annealing" processes.

In embodiments in which a carbonate catalyst material 20 (e.g., a carbonate of one or more of Mg, Ca, Sr, and Ba) is used to catalyze the formation of polycrystalline diamond, the particulate mixture may be subjected to a pressure greater than about 7.7 gigapascals (7.7 GPa) and a temperature greater than about 2,000° C.

The particulate mixture may comprise the larger grains 18 previously described herein. The particulate mixture may also comprise particles of catalyst material. In some embodiments, the particulate material may comprise a powder-like substance. In other embodiments, however, the particulate material may be carried by (e.g., on or in) another material, such as a paper or film, which may be subjected to the HTHP process. During the HTHP process, additional smaller grains of hard material may nucleate and grow on the nucleation particles present in the particulate mixture. These in situ nucleated grains may comprise the smaller grains 16 of the hard polycrystalline material 12, as previously described herein. To facilitate the in situ nucleation of the smaller grains 16, the particulate mixture subjected to the HTHP process may further include a plurality of nucleation particles (e.g., seed particles), as well as a source material that will be used to form (i.e., incorporate into) the in situ nucleated smaller grains 16. In embodiments in which the smaller grains 16 comprise diamond grains, for example, the source material will comprise a carbon-containing substance such as amorphous carbon or graphite.

The nucleation particles in the particulate mixture may comprise any type of particle on which grains of the hard polycrystalline material 12 will nucleate and grow during an HTHP process. In embodiments in which the hard polycrystalline material 12 includes polycrystalline diamond, the nucleation particles may comprise, for example, fullerenes, diamondoids, amorphous carbon nanoparticles, or graphite nanoparticles.

It is known that ions may be implanted into fullerene molecules, and such ion-implanted fullerenes also may be employed in embodiments of the present invention. For example, ions of metals such as, for example, cobalt, iron, or nickel may be implanted into fullerene molecules and employed as nucleation particles in accordance with embodiments of the present invention.

In some embodiments, the particulate mixture used to form the hard polycrystalline material 12 may include composite nucleation particles, each of which may include a nucleation particle and a source material that includes atoms that will ultimately be used to form an in situ nucleated grain on the nucleation particle. Such composite nucleation particles also may include a catalyst material for catalyzing the nucleation and/or growth of an in situ nucleated grain on the nucleation particle.

Figure 2:
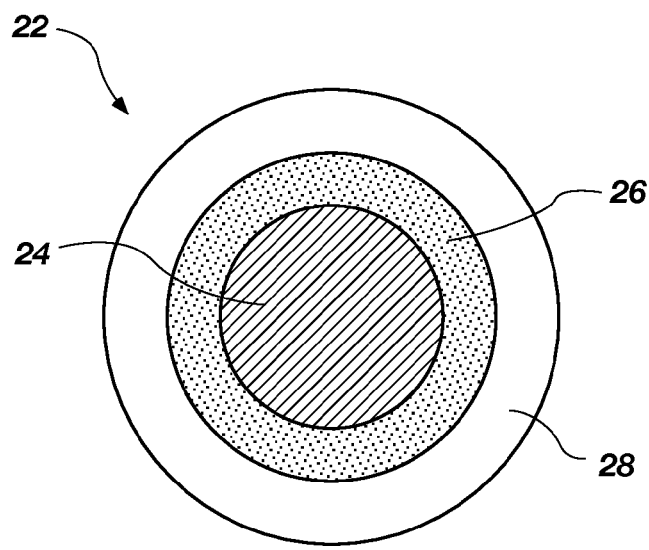
FIG. 2 is a simplified drawing of a composite nucleation particle that may be used to form in situ nucleated grains of hard material in a hard polycrystalline material like that of FIGS. 1A and 1B in accordance with embodiments of methods of the present invention.

FIG. 2 illustrates a simplified drawing of an embodiment of a composite nucleation particle 22 that includes a core nucleation particle 24, a layer of source material 26 at least partially coating the core nucleation particle 24, and a layer of catalyst material 28 at least partially coating the layer of source material 26. The core nucleation particle 24 may comprise a single seed particle or a cluster of seed particles. The catalyst material 28 comprises a material that will catalyze the nucleation and/or growth of an in situ nucleated grain (e.g., a grain of the smaller grains 16 of FIG. 1B) on the core nucleation particle 24. Catalyst materials that catalyze the formation of inter-granular bonds between adjacent grains of material, such as the catalyst materials 20 previously described herein, may also catalyze the nucleation and/or growth of an in situ nucleated grain on the core nucleation particle 24. Thus, in some embodiments, the catalyst material 28 may comprise any of the catalyst materials previously described herein in relation to the catalyst material 20 of FIG. 1B.

In embodiments in which the hard polycrystalline material 12 comprises polycrystalline diamond, the core nucleation particle 24 may comprise, for example, any of diamond, a diamond-like substance (e.g., diamond-like carbon), graphite, and a fullerene (e.g. $C_{60}$ fullerene) or a cluster of fullerenes. As a non-limiting example, the core nucleation particle 24 may comprise a diamondoid nanoparticle such as, for example, those disclosed in Dahl et al., "Isolation and Structure of Higher Diamondoids, Nanometer-Sized Diamond Molecules," Science 299, 96 (2003). In additional embodiments, the core nucleation particle 24 may include any of graphite, metals, metal alloys, nitrides, borides, oxides, and carbides. For example, amorphous carbon layers formed on particles of Ni, Pt, Cu, Fe, Co, Mo, Mg, Ag, Ti, Nb, Y, and Si may facilitate diamond nucleation thereon. Further, the core nucleation particle 24 may comprise a material that does not readily form a carbide compound such as, for example, Cu or Au. In embodiments in which the hard polycrystalline material 12 comprises polycrystalline diamond, the layer of source material 26 comprises carbon (e.g., graphite or amorphous carbon), and the layer of catalyst material 28 may comprise a Group VIIIA element, such as iron, nickel, or cobalt, or an alloy thereof. The carbon source may include graphite or amorphous carbon.

Table 1 below lists the materials of the core nucleation particle 24, the layer of source material 26, and the layer of catalyst material 28 of some embodiments of composite nucleation particles 22, as described herein with reference to FIG. 2.

TABLE 1

| Core Nucleation Particle | Source Material | Catalyst Material |
|---|---|---|
| $C_{60}$ Fullerene | Graphite | Cobalt |
| $C_{60}$ Fullerene | Amorphous Carbon | Cobalt |
| $C_{60}$ Fullerene | Amorphous Carbon | Iron |
| $C_{60}$ Fullerene | Amorphous Carbon | Nickel |
| $C_{70}$ Fullerene | Amorphous Carbon | Cobalt |
| $C_{70}$ Fullerene | Amorphous Carbon | Iron |
| $C_{70}$ Fullerene | Amorphous Carbon | Nickel |
| Platinum | Amorphous Carbon | Cobalt |
| Platinum | Graphite | Iron |
| Platinum | Graphite | Nickel |

The core nucleation particles 24 may have an average particles size between about two nanometers (2 nm) and about one hundred nanometers (100 nm). The thickness of the layer of source material 26 and the layer of catalyst material 28 will depend upon the particular material compositions of these layers, as well as on the material composition and size of the in situ nucleated grain of hard material to be formed therewith.

The composite nucleation particles 22 may be formed by depositing, growing, or otherwise providing a layer of source material 26 on a core nucleation particle 24, and then depositing, growing, or otherwise providing a layer of catalyst material 28 on the layer of source material 26. The particular process used to deposit each layer will depend upon the particular material composition of that layer. Many suitable processes for depositing such layers are known in the art including, for example, physical deposition processes (e.g., sputtering, also known as physical vapor deposition (PVD), etc.) and chemical deposition processes (e.g., chemical vapor deposition (CVD), atomic layer deposition (ALD), etc.). In some embodiments, the layer of source material 26 and the layer of catalyst material 28 may be provided on the nucleation particles 22 in a fluidized bed reactor.

For example, metal particles may be coated with carbon using flame spray synthesis techniques like those described in Athanassiou et al., Nanotechnology, 17 1668-1673 (2006), which is incorporated herein in its entirety by this reference. Plasma reactors also may be used to form amorphous carbon films. For example, fullerenes and other non-metallic particles may be coated by first depositing the particles onto a substrate in a thin layer. The particles may be deposited onto the substrate by, for example, suspending the particles in a fluid (e.g., a polar liquid) to form a suspension, dispersing the suspension over a surface of the substrate, and evaporating the fluid from the surface of the substrate and leaving the particles behind on the surface. The substrate with the fullerene particles thereon then may be placed into a plasma deposition chamber and coated with an amorphous carbon film using processes known in the art. The coated fullerene particles may be removed from the chamber, and if not fully coated, may be mechanically ground into a powder, re-deposited onto a substrate and re-coated, as previously described. This process may be repeated until a desirable coating has been attained on the particles.

Figure 3:
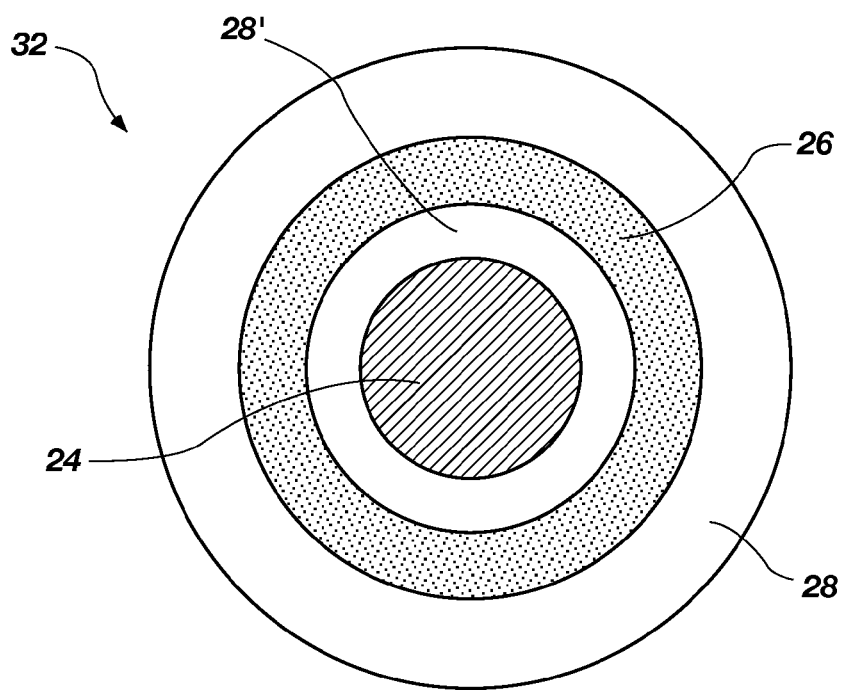
FIG. 3 is a simplified drawing of another composite nucleation particle that may be used to form in situ nucleated grains of hard material in a hard polycrystalline material like that of FIGS. 1A and 1B in accordance with embodiments of methods of the present invention.

FIG. 3 depicts another embodiment of a composite nucleation particle 32 that may be included in a particulate mixture used to form a hard polycrystalline material 12 in an HTHP process, as previously described herein. The composite nucleation particle 32 is similar to the composite nucleation particle 22 of FIG. 2, and includes an inner core nucleation particle 24, a layer of source material 26, and a layer of catalyst material 28. The nucleation particle 32 of FIG. 3, however, includes an additional layer of catalyst material 28' disposed between the core nucleation particle 24 and the layer of source material 26. Thus, in the embodiment of FIG. 3, the additional layer of catalyst material 28' at least partially coats (e.g., encapsulates) the core nucleation particle 24, the layer of source material 26 at least partially coats the additional layer of catalyst material 28', and the layer of catalyst material 28 at least partially coats the layer of source material 26.

As the density of the source material 26 and the density of the resulting in situ grains formed using the source material 26 may vary, the difference in densities must be accounted for when selecting the particle size of the composite nucleation particles 22, 32 to form resulting in situ nucleated smaller grains 16 (FIG. 1B) having a selected average grain size.

Figure 4:
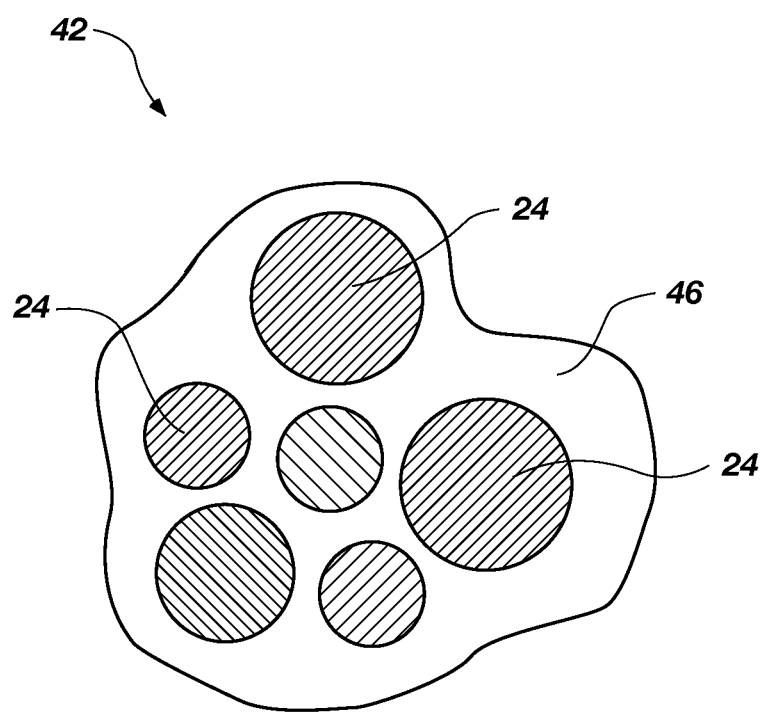
FIG. 4 is a simplified drawing of an embodiment of a particle cluster that may be used to form in situ nucleated grains of hard material in a hard polycrystalline material like that of FIGS. 1A and 1B in accordance with embodiments of methods of the present invention.

FIG. 4 depicts another embodiment of a composite nucleation particle 42 that may be included in a particulate mixture used to form a hard polycrystalline material 12 in an HTHP process, as previously described herein. The composite nucleation particle 42 comprises a cluster of core nucleation particles 24. The core nucleation particles 24 in each composite nucleation particle 42 may be substantially identical to one another, or the composite nucleation particle 42 may comprise a mixture of one or more of the different types of core nucleation particles 24 previously mentioned herein. In some embodiments, the core nucleation particles 24 may be held together in a binder material 46, which may comprise, for example, a metal material, a polymer material, an organic material, etc. In some embodiments, the binder material 46 may comprise a source material 26, a catalyst material 28, or a mixture of a source material 26 and a catalyst material 28. In other embodiments, the core nucleation particles 24 may simply be held together by inter-particle forces (e.g., van der Waals forces). The composite nucleation particle 42 also may be coated with one or more of a layer of source material 26 and a layer of catalyst material 28, as previously described in relation to the composite nucleation particle 22 of FIG. 2 and the composite nucleation particle 32 of FIG. 3.

When composite nucleation particles 22, 32, 42 are added to a particulate mixture and subjected to an HTHP process as previously described, an in situ nucleated grain of hard material (e.g., diamond, cubic boron nitride, etc.) may nucleate and grow on the core nucleation particles 24 of the composite nucleation particles 22, 32, 42. The atoms of the source material 26 may be used to form (and become incorporated in) the growing in situ nucleated grains of hard material. In other words, the source material 26 is consumed by the growing in situ nucleated grains of hard material. Furthermore, the nucleation and/or growth of the in situ nucleated grains of hard material may be catalyzed by the catalyst material 28, 28'. The parameters of the HTHP process (e.g., temperature, pressure, time, etc.) may be selectively controlled to result in the formation of in situ nucleated smaller grains 16 of hard material within the resulting hard polycrystalline material 12. Thus, the smaller grains 16 of hard material may be nucleated and catalyzed in the presence of the larger grains 18 of hard material, and the formation of inter-granular bonds between the smaller grains 16 and the larger grains 18 of hard material may be catalyzed.

As previously mentioned, catalyst material may be used to catalyze the formation of the inter-granular bonds between the in situ nucleated smaller grains 16 and the larger grains 18 during the HTHP process, as well as to catalyze the nucleation and/or growth of the in situ nucleated smaller grains 16. After the HTHP process, some catalyst material 20 (e.g., cobalt) may remain in the interstitial spaces between the inter-bonded smaller grains 16 and larger grains 18.

Optionally, such catalyst material 20 may be removed from the hard polycrystalline material 12 after the HTHP process, as known in the art. For example, a leaching process may be used to remove catalyst material 20 from interstitial spaces between the inter-bonded grains of the hard polycrystalline material 12. By way of example and not limitation, the hard polycrystalline material 12 may be leached using a leaching agent and process such as those described more fully in, for example, U.S. Pat. No. 5,127,923 to Bunting et al. (issued Jul. 7, 1992, and U.S. Pat. No. 4,224,380 to Bovenkerk et al. (issued Sep. 23, 1980), the disclosure of each of which patent is incorporated herein in its entirety by this reference. Specifically, aqua regia (a mixture of concentrated nitric acid ($HNO_3$) and concentrated hydrochloric acid (HCl)) may be used to at least substantially remove catalyst material from the interstitial spaces between the inter-bonded grains in the hard polycrystalline material 12. It is also known to use boiling hydrochloric acid (HCl) and boiling hydrofluoric acid (HF) as leaching agents. One particularly suitable leaching agent is hydrochloric acid (HCl) at a temperature above 110° C., which may be provided in contact with the hard polycrystalline material 12 for a period of about two (2) hours to about sixty (60) hours, depending upon the size of the body comprising the hard polycrystalline material 12. After leaching the hard polycrystalline material 12, the interstitial spaces between the inter-bonded grains within the hard polycrystalline material 12 may be at least substantially free of catalyst material 20 used to catalyze formation of inter-granular bonds between the grains in the hard polycrystalline material 12.

The overall polycrystalline microstructure that may be achieved in accordance with embodiments of the present invention may result in polycrystalline diamond compacts that exhibit improved durability and thermal stability.

Figure 5:
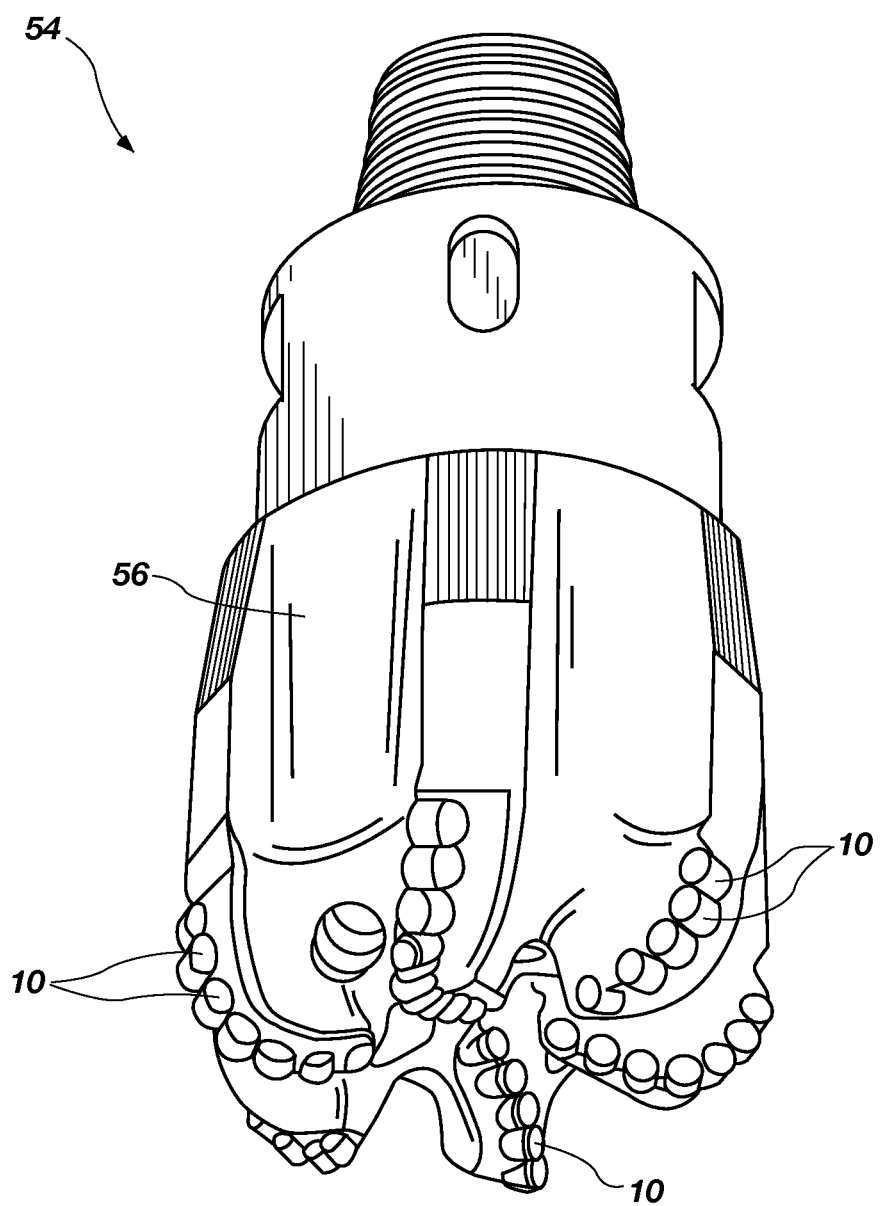
FIG. 5 is a perspective view of an embodiment of a fixed-cutter earth-boring rotary drill bit that includes a plurality of polycrystalline compacts like that shown in FIGS. 1A and 1B.

Polycrystalline compacts that embody teachings of the present invention, such as the polycrystalline compact 10 illustrated in FIGS. 1A and 1B, may be formed and secured to drill bits for use in forming wellbores in subterranean formations. As a non-limiting example, FIG. 5 illustrates a fixed cutter type earth-boring rotary drill bit 54 that includes a plurality of polycrystalline compacts 10 as previously described herein. The earth-boring rotary drill bit 54 includes a bit body 56, and the polycrystalline compacts 10, which serve as cutting elements, are bonded to the bit body 56. The polycrystalline compacts 10 may be brazed (or otherwise secured) within pockets formed in the outer surface of the bit body 56.

The foregoing description is directed to particular embodiments for the purpose of illustration and explanation. It will be apparent, however, to one skilled in the art that many modifications and changes to the embodiments set forth above are possible without departing from the scope of the embodiments disclosed herein as hereinafter claimed, including legal equivalents. It is intended that the following claims be interpreted to embrace all such modifications and changes.

What is claimed is:

1. A polycrystalline compact, comprising:
a hard polycrystalline material comprising:
a plurality of in situ nucleated smaller grains of hard material having a first average grain size, the in situ nucleated smaller grains formed during an HTHP (high-temperature, high-pressure) process; and
a plurality of larger grains of hard material having a second average grain size, the plurality of in situ nucleated smaller grains and the plurality of larger grains being interspersed and inter-bonded.

2. The polycrystalline compact of claim 1, wherein the second average grain size is at least about 150 times greater than the first average grain size.

3. The polycrystalline compact of claim 1, further comprising a catalyst material disposed in at least some interstitial spaces between the interspersed and inter-bonded grains of hard material.

4. The polycrystalline compact of claim 1, wherein each of the hard material of the plurality of smaller grains and the hard material of the plurality of larger grains comprises diamond.

5. The polycrystalline compact of claim 1, wherein each of the hard material of the plurality of smaller grains and the hard material of the plurality of larger grains comprises cubic boron nitride.

6. The polycrystalline compact of claim 1, wherein the plurality of smaller grains of hard material comprises between about one-half of one percent (0.5%) and about thirty percent (30%) by volume of the hard polycrystalline material.

7. The polycrystalline compact of claim 1, wherein the first average grain size is between about six nanometers (6 nm) and about one hundred fifty nanometers (150 nm), and the second average grain size is between about five microns (5 µm) and about forty microns (40 µm).

8. The polycrystalline compact of claim 1, further comprising at least one of molybdenum, magnesium, neodymium, and titanium disposed in at least some interstitial spaces between the interspersed and inter-bonded grains of hard material.

9. The polycrystalline compact of claim 1, further comprising a refractory metal carbide disposed in at least some interstitial spaces between the interspersed and inter-bonded grains of hard material.

10. An earth-boring tool, comprising:
a body; and
at least one polycrystalline compact attached to the body, the at least one polycrystalline compact comprising:
a hard polycrystalline material comprising:
a plurality of in situ nucleated smaller grains of hard material having a first average grain size, the in situ nucleated smaller grains formed during an HTHP (high-temperature, high-pressure) process; and
a plurality of larger grains of hard material having a second average grain size, the plurality of in situ nucleated smaller grains and the plurality of larger grains being interspersed and inter-bonded.

11. A method of forming a polycrystalline compact, comprising:
nucleating and catalyzing the formation of a plurality of in situ nucleated smaller grains of hard material in the presence of a plurality of larger grains of hard material during an HTHP (high-temperature, high-pressure) process; and
catalyzing the formation of inter-granular bonds between the plurality of in situ nucleated smaller grains of hard material and the plurality of larger grains of hard material to form a polycrystalline material comprising the plurality of in situ nucleated smaller grains of hard material and the plurality of larger grains of hard material, the plurality of in situ nucleated smaller grains and the plurality of larger grains being interspersed and inter-bonded.

12. The method of claim 11, further comprising selecting the hard material of each of the in situ nucleated smaller grains of hard material and the larger grains of hard material to comprise cubic boron nitride.

13. The method of claim 11, further comprising selecting the hard material of each of the in situ nucleated smaller grains of hard material and the larger grains of hard material to comprise diamond.

14. The method of claim 13, wherein the actions of nucleating and catalyzing the formation of the plurality of in situ nucleated smaller grains and catalyzing the formation of inter-granular bonds are carried out at a pressure greater than about six and one-half gigapascals (6.5 GPa) and a temperature greater than about 1,500° C.

15. The method of claim 14, wherein nucleating and catalyzing the formation of a plurality of in situ nucleated smaller grains of hard material comprises coating nucleation particles with a carbon source.

16. The method of claim 15, further comprising:
selecting the nucleation particles to comprise at least one of a metal, a carbide, a nitride, a boride, an oxide, graphite, and a fullerene; and
selecting the carbon source to comprise at least one of graphite and amorphous carbon.

17. The method of claim 16, further comprising coating the carbon source on the nucleation particles with a catalyst material comprising at least one of cobalt, iron, and nickel.

18. A method of forming a polycrystalline diamond compact, comprising:
mixing a plurality of nucleation particles with a plurality of larger diamond grains, a carbon source, and a catalyst for catalyzing the formation of diamond material;
subjecting the mixture to an HTHP (high-temperature, high-pressure) process at a pressure greater than about five gigapascals (5.0 GPa) and a temperature greater than about 1,000° C.;
forming a plurality of in situ nucleated smaller diamond grains during the HTHP process by catalyzing the formation of diamond material on the plurality of nucleation particles using the carbon source and the catalyst; and
catalyzing the formation of diamond-to-diamond bonds between the diamond grains of the plurality of larger diamond grains and the plurality of in situ nucleated smaller diamond grains during the HTHP process to form a polycrystalline diamond material comprising the plurality of in situ nucleated smaller diamond grains and the plurality of larger diamond grains, the plurality of in situ nucleated smaller diamond grains and the plurality of larger diamond grains being interspersed and inter-bonded.

19. The method of claim 18, further comprising selecting the nucleation particles of the plurality of nucleation particles to comprise nanoparticles of at least one of a metal, a carbide, a nitride, a boride, an oxide, graphite, and a fullerene.

20. The method of claim 18, further comprising selecting the carbon source to comprise at least one of graphite and amorphous carbon.

21. The method of claim 18, further comprising selecting the catalyst to comprise at least one of cobalt, iron, and nickel.

22. The method of claim 18, further comprising coating the nucleation particles of the plurality of nucleation particles with at least one of the carbon source and the catalyst.

23. The method of claim 22, further comprising forming a plurality of composite nucleation particles comprising:
an inner core comprising at least one nucleation particle of the plurality of nucleation particles;
an intermediate layer comprising the carbon source; and
an outer layer comprising the catalyst.

24. The method of claim 22, further comprising forming a plurality of composite nucleation particles comprising a cluster of core nucleation particles embedded within a binder material.

25. The method of claim 18, wherein subjecting the mixture to a pressure greater than about five gigapascals (5.0 GPa) and a temperature greater than about 1,000° C. comprises subjecting the mixture to a pressure greater than about six and one-half gigapascals (6.5 GPa) and a temperature greater than about 1,500° C. for less than about two minutes (2.0 min.).

26. The method of claim 18, further comprising:
forming the plurality of in situ nucleated smaller diamond grains to have a first average particle size; and
selecting the plurality of larger diamond grains to have a second average particle size that is at least about 150 times greater than the first average particle size.

27. The method of claim 18, further comprising subjecting the mixture to a temperature between about 400° C. and about 800° C. for at least about thirty (30) minutes.

* * * * *